Jan. 10, 1961    R. F. ENO ET AL    2,967,989
HIGH VOLTAGE POWER SUPPLY

Filed Sept. 27, 1956    2 Sheets-Sheet 1

*INVENTOR.*
ROBERT F. ENO
CHARLES F. SWETT
BY REXFORD F. GOODE
PAUL F. MOONEY
HARRY F. ECKERLE

*Lewis L. Humphries*
ATTORNEY

Jan. 10, 1961   R. F. ENO ET AL   2,967,989
HIGH VOLTAGE POWER SUPPLY
Filed Sept. 27, 1956   2 Sheets-Sheet 2

INVENTOR.
ROBERT F. ENO
CHARLES F. SWETT
REXFORD F. GOODE
PAUL F. MOONEY
HARRY F. ECKERLE

BY Lewis L. Humphries
ATTORNEY

United States Patent Office 2,967,989
Patented Jan. 10, 1961

2,967,989

HIGH VOLTAGE POWER SUPPLY

Robert F. Eno, Lakewood, Charles F. Swett, Downey, Rexford F. Goode, Puente, Paul F. Mooney, Fullerton, and Harry F. Eckerle, Long Beach, Calif., assignors to North American Aviation, Inc.

Filed Sept. 27, 1956, Ser. No. 612,439

8 Claims. (Cl. 321—2)

This invention relates to direct current power supplies and more particularly to a saturable transformer-controlled high voltage direct current power supply.

High voltage direct current power supplies have many uses in present day electronic systems. In some applications such as in aircraft radar systems, a power supply is required which will produce a precise high voltage direct current output with a minimum of components which must be reliable and of light weight. In addition, the power supply circuit must be small enough in size to fit in the minimum space provided in the aircraft and still possess the maximum of reliability and efficiency.

Present design of high voltage direct current power supplies customarily includes electronic tubes in combination with other elements. In order to provide a high voltage with the required efficiency and reliability, complicated circuitry and components of considerable size and weight are necessary. Applications where considerable power is needed and for which there is also a high voltage requirement preclude the use of presently designed vacuum tubes and other components due to weight limitations in aircraft.

This invention contemplates a device which overcomes the above mentioned disadvantages of conventional high voltage direct current power supplies by using an efficient and reliable circuit which produces a high voltage, high power direct current output from a low voltage direct current input. A low voltage direct current source is converted to a high frequency alternating current by a magnetic alloy controlled transistor oscillator circuit and the resulting alternating current is rectified and multiplied several times to produce a high voltage direct current output.

The combination of transistors and a transformer of square hysteresis material produces an efficient and reliable high voltage power supply using a minimum of light weight components. The use of transistors is well-known. Used as a controlled switch, the transistor can be designed to have an effective impedance of 1 megohm at cut off and a few ohms at saturation by controlling the base voltage and current. In a PNP transistor switch, the PNP transistor will conduct if the base is negative with respect to either emitter or collector and will block or prevent conduction if the base is positive with respect to both emitter and collector. Similar operation will occur for an NPN transistor. It is also well-known that the inductive reactance in an iron core inductance may be controlled to offer more or less reactance by controlling the flux level of the core. Devices incorporating saturated magnetic devices have a high degree of dependability with resulting low maintenance. They are inherently efficient and combine well with other electronic circuits. Circuits employing saturable reactors are simple. No "firing" circuits or grid controls, common in electronic circuits using vacuum tubes, are needed.

This invention contemplates the use of a magnetically coupled transistor multivibrator in combination with a voltage multiplier and rectifier to produce a high voltage direct current output from a low voltage direct current input.

A particular advantage of this invention is the simplicity and minimum number of elements of superior reliability obtained by combining a saturable transformer with transistor circuitry.

It is therefore an object of this invention to provide a high voltage direct current power supply of relatively simple elements.

It is another object of this invention to provide a saturable transformer-controlled high voltage direct current power supply.

It is still another object of this invention to provide a direct current power supply which can deliver large amounts of power at a high voltage.

It is a further object of this invention to provide a high voltage direct current power supply combining transistor circuits and saturable magnetic devices to provide a high power, high voltage output.

It is a still further object of this invention to provide a high voltage direct current power supply combining a magnetically coupled transistor oscillator with a rectifier and doubler circuit to provide a high voltage output.

It is another object of this invention to provide a high voltage direct current power supply combining a transistorized direct current-alternating current converter with a multiplier circuit to provide a high voltage high power direct current output.

It is a further object of this invention to provide an improved direct current-alternating current converter.

It is another object of this invention to provide a direct current power supply of light weight and improved reliability and high efficiency.

It is a further object of this invention to provide a regulated direct current power supply using transistors and magnetic devices.

Other objects will become apparent from the following description taken in connection with the accompanying drawings, in which—

Figure 5:
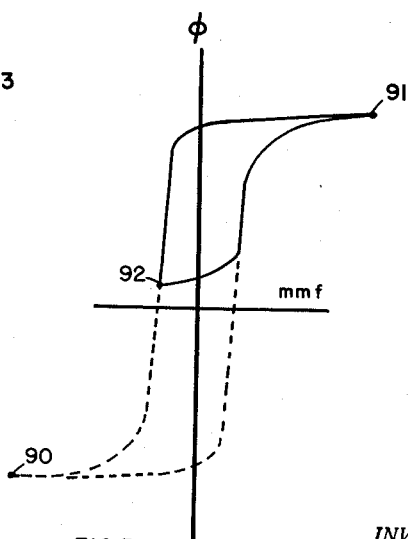
Figure 2:
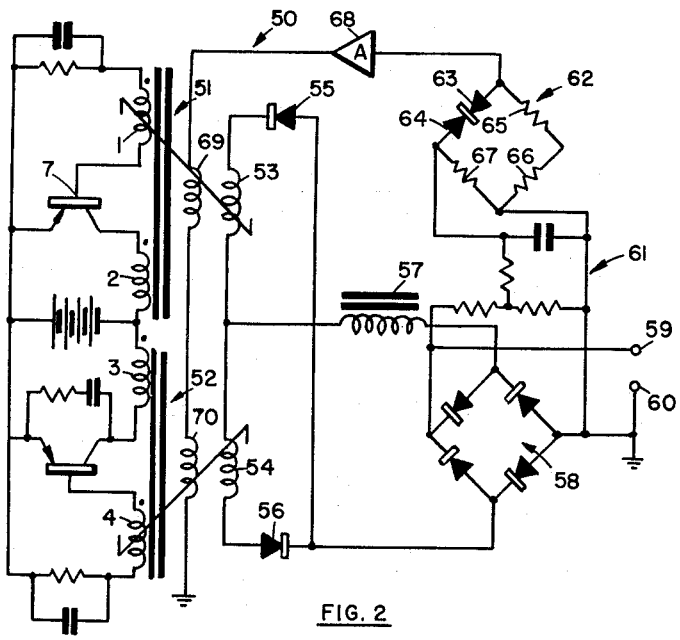
Fig. 2 is a schematic diagram of another embodiment of the invention showing a regulated power supply.

And Fig. 5 is a graph of a hysteresis curve showing the operation of the saturable transformer of Fig. 2 during voltage regulation.

Figure 1:
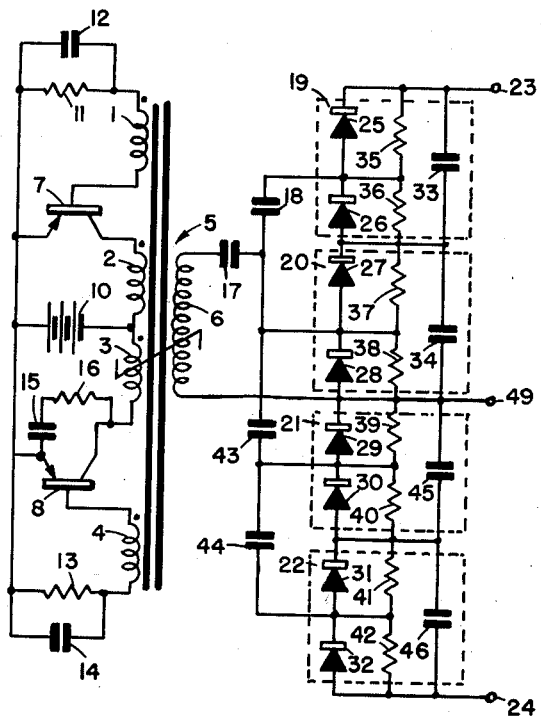
Fig. 1 is a schematic diagram showing one embodiment of the invention.

In Fig. 1 windings 2 and 3 connected in series form the primary winding, windings 1 and 4 form control windings and winding 6 forms the secondary winding of saturable transformer 5. One end of winding 2 is connected to the collector of transistor 7 and the other end of winding 2 is connected to the negative terminal of low voltage direct current supply 10. The positive terminal of direct current supply 10 is connected to the emitter of transistor 7. One end of winding 1 is connected to the base of transistor 7 and the other end is connected through the parallel circuit formed by resistor 11 and capacitor 12 to the emitter of transistor 7. One end of winding 3 is connected to the collector of transistor 8 and the other end is connected to the negative terminal of direct current supply 10. The emitter of transistor 8 is connected to the positive terminal of direct current supply 10. One end of winding 4 is connected to the base of transistor 8 and the other end is connected through the parallel circuit formed by resistor 13 and capacitor 14 to the emitter of transistor 8. Resistor 16 and capacitor 15 are connected in series across the collector-emitter of transistor 8.

Transistors 7 and 8, connected to form a free running multivibrator, alternately conduct and switch the input voltage received from direct current supply 10 across windings 2 and 3 causing the flux in the core of saturable transformer 5 to be cycled between saturation in one direction and then in the other. Windings 1 and 4 act as control windings for transistors 7 and 8, respectively. Windings 2 and 3 couple the current alternately flowing through the emitter-collector circuits of transistors 7 and 8 to winding 6. The output across winding 6 is a square wave.

To provide for a sharp cut off of transistors 7 and 8 when the multivibrator changes states, resistor 11 and capacitor 12 in the circuitry of transistor 7 and resistor 13 and capacitor 14 in the circuitry of transistor 8 operate to correct the detrimental effect of carrier storage inherent in transistors. When one of the transistors is conducting and a signal is received to stop conduction thereof, the transistor will tend to still conduct due to the presence of minority carriers in the base near the emitter. When this occurs in transistor 7, for example, capacitor 12 which was charged when transistor 7 was conducting will discharge through the emitter-base of transistor 7 clearing the transistor of the stored positive minority carriers and further biasing the emitter to facilitate cutoff. Identical operation occurs with transistor 8 in combination with resistor 13 and capacitor 14. In this manner transistors 7 and 8 are sharply cut off when the control bias signal on the respective bases is removed.

Resistor 16 and capacitor 15 connected series across the collector-emitter of transistor 8 allows the multivibrator circuit to commence operation when the output at secondary winding 6 is connected to a load. When the output is connected to a load, an initial surge in current is initiated which reflects through secondary winding 6 to the primary windings. This surge in current is applied to the collector of transistor 8 by winding 3. Capacitor 15 and comparatively low resistance 16 momentarily short transistor 8 providing a current across the collector-emitter circuit through resistor 16 and capacitor 15 thereby inducing a D.-C. current from D.-C. supply 10 into winding 3.

Connected to secondary winding 6 of saturable transformer 5 are voltage doubler circuits 19, 20, 21 and 22 which are connected in series arrangement to multiply and rectify the A.-C. voltage from winding 6 to provide a direct current output across terminals 23 and 24. The output voltage across terminals 23 and 49 and terminals 24 and 49 is equal to four times the voltage across winding 6 and the voltage across terminals 23 and 24 is equal to eight times the voltage across winding 6. In voltage doubler circuit 20, winding 6 is connected across diode 28 in series with capacitor 17 forming a charging circuit including winding 6, capacitor 17 and diode 28 all in series. Capacitor 34 is shunted across diodes 27 and 28 forming a charging circuit including winding 6, capacitor 17, diode 27 and capacitor 34 all in series. Resistors 37 and 38 are connected in series across capacitor 34 to allow the charge on capacitor 34 to leak off when the circuit is not energized. This is necessary as a safety measure to prevent injury from the high voltage on the capacitor after the circuit has been disconnected. In voltage doubler circuit 20 the voltage across capacitor 34 is equal to twice the voltage across winding 6. Similarly, in voltage doubler 19, winding 6 is connected across diode 26 in series with capacitors 17 and 18 forming a charging circuit including winding 6, capacitors 17 and 18, diode 26, and capacitor 34 all in series. Capacitor 33 is shunted across diodes 25 and 26 forming a charging circuit including winding 6, capacitors 17 and 18, diode 25, capacitor 33, and capacitor 34 all in series. Resistors 35 and 36 discharge capacitor 33 to allow safe operation. The voltage across capacitor 33 is equal to twice the voltage across winding 6. In voltage doubler circuit 21, winding 6 is connected across diode 29 in series with capacitors 17 and 43 forming a charging circuit including winding 6, capacitors 17 and 43 and diode 29 all in series. Capacitor 45 is shunted across diodes 29 and 30 forming a charging circuit including winding 6, capacitors 17 and 43, diode 30 and capacitor 45 all in series. Resistors 39 and 40 are connected across capacitor 45 to discharge said capacitor. The voltage across capacitor 45 is equal to twice the voltage across winding 6. In voltage doubler circuit 22, winding 6 is connected across diode 31 in series with capacitors 17, 43 and 44 forming a charging circuit including winding 6, capacitors 17, 43 and 44 and diode 31, and capacitor 45 all in series. Capacitor 46 is shunted across diodes 31 and 32 forming a charging circuit including winding 6, capacitors 17, 43 and 44, diode 32, and capacitors 46 and 45 all in series. Resistors 41 and 42 are connected across capacitor 46 to discharge said capacitor. The voltage across capacitor 46 is equal to twice the voltage across winding 6. The voltage across capacitors 33, 34, 45 and 46, all twice the voltage across winding 6, are connected to act in series so that the voltage across winding 6 and the voltage across capacitors 45 and 46 taken at terminals 24 and 49 is also equal to four times the voltage across winding 6. The voltage across capacitors 33, 34, 45 and 46 taken at terminals 23 and 24 is thereby equal to eight times the voltage across winding 6. The rectifier and doubler circuit, thus shown, operates as an efficient and reliable voltage doubling circuit. Any number of other standard multiplying circuits would also work in this invention.

In order to achieve a high voltage output a ratio of turns in the order of 1 to 35 between primary and secondary of transformer 5 is selected. This, combined with the multiplication obtained from the voltage doubler circuits, provides a multiplication of over 250 to 1. This multiplication could be increased simply by adding more voltage doubler circuits in series with those shown. Utilizing the voltage doubler circuits allows the use of a smaller transformer than would be required if all the voltage multiplication was obtained solely from the transformer windings. The core material for transformer 5 is selected from a high-remanence core of a substantially square hysteresis curve. Such a core may be made of Deltamax or Supermalloy. The number of turns in control windings 1 and 4 is equal to approximately one-fourth of the turns in windings 2 and 3 in order to provide the proper voltage at the bases of transistors 7 and 8.

In operation, it is assumed the free running multivibrator comprising transistors 7 and 8 is in the state wherein transistor 7 is conducting and transistor 8 is blocking. With transistor 7 conducting, the input voltage from direct current supply 10 is placed across winding 2 positive at the top as indicated by the polarity dot on Fig. 1 and negative at the bottom. Voltage with corresponding polarities will be induced in windings 1, 3 and 4, the polarity dots indicating positive voltage as in winding 2. This induced voltage in winding 1 which is positive at the end of the winding indicated by the polarity dot and negative at the end of the winding connected to the base of transistor 7 makes the base of transistor 7 negative with respect to the emitter, and transistor 7 conducts with very little voltage drop between the emitter and the collector. Transistor 7 continues to conduct until the flux in the core of saturable transformer 5 reaches saturation value.

When saturable transformer 5 is saturated, the induced voltage in the transformer windings disappears. Because of the loss of induced voltage in winding 1 the base of transistor 7 becomes less negative with respect to the collector, causing transistor 7 to cease conduction thereby opening the circuit between direct current power supply 10 and winding 2. The positive minority carriers stored in the base of transistor 7 accumulate on one side of capacitor 12. When transistor 7 starts to cut off, a reverse flux occurring in the core of saturable transformer 5 in the direction of the residual flux level of the core instantaneously reverses the polarity of the induced voltage in windings 1, 2, 3 and 4, causing transistor 7 to be driven well into cutoff. Since the polarity of windings 1, 2, 3 and 4 has reversed the polarity dots of the windings now indicates a negative potential, and the base of transistor 8 becomes negative with respect to its emitter being connected to the end of winding 4 indicated by the polarity dot which is now negative. With transistor 8 conducting, the core flux of saturable transformer 5 decreases until the core saturates in the opposite direction causing transistor 8 to conduct heavily until saturable transformer 5 is saturated in the opposite direction, at which time the induced voltage in windings 1, 2, 3 and 4 again disappears and the negative potential at the polarity dots of winding 4 starts to go positive, tending to cut off the flow of current in the emitter-collector circuit of transistor 8. This decreases the current flow and causes the voltage across winding 3 to reverse, thereby tending to saturate the core of saturable transformer 5 in a new direction. Transistor 8 is cut off and a new cycle commences with transistor 7 commencing conduction.

The output voltage across winding 6 of saturable transformer 5 is a square wave with the frequency proportional to the time it takes the flux in the core of saturable transformer 5 to change from saturation in one direction to saturation in the other direction, thereby providing an alternating current across winding 6 whose frequency is proportional to the input voltage from direct current power supply 10. Thus far in the circuit a low voltage direct current has been converted to a square wave alternating current. Voltage doubler circuits 19, 20, 21 and 22 operating in series rectify the square wave obtained from winding 6 and multiplying the voltage by 8, the output of voltage appearing across terminals 23 and 24.

Figure 4:
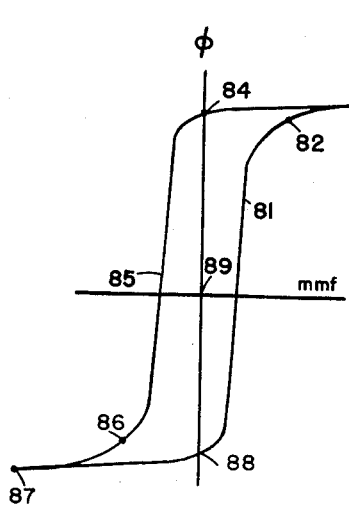
Fig. 4 is a graph of a hysteresis curve showing the operation of the saturable transformer of Fig. 1.

A more thorough understanding of the operation of the multivibrator action of transistors 7 and 8 controlled by saturable transformer 5 may be had by describing the action of the circuit in relation to the core of transformer 5. In Fig. 4 a graph shows the operation of the core of saturable transformer 6 about its hysteresis loop during one complete cycle of multivibrator action. In the beginning, assuming that the free running multivibrator is in the condition wherein transistor 7 is conducting and transistor 8 is cut off, the induced voltages in primary windings 1, 2, 3 and 4 will have a polarity wherein the polarity dots in Fig. 1 are positive. This induced voltage will cause an M.M.F. to be exerted on the core of saturable transformer 5 in a positive direction and the core is proceeding toward saturation along line 81. When the flux level of the core reaches the knee of the core approximately at point 82, the rate of change of flux in the core, which up until now has been relatively constant, will be reduced causing a reduction in the induced voltages of the transformer windings including control winding 1. Transistor 7, losing the negative bias on its base, starts to cut off. At core saturation, indicated by point 83, the decreased current flowing in transistor 7 starts a reverse flux change toward the residual flux level of the core at point 84. Because of this small flux change, the polarity of all the induced voltages will be reversed instantaneously causing transistor 7 to be driven well into cut off by the positive going potential on its base. At the same time (point 84 on the curve) the voltage induced in winding 4 becomes negative enough at the end connected to the base of transistor 8 to cause conduction in that transistor. With transistor 8 conducting the increase of current in winding 3 causes an induced voltage in the winding which causes an M.M.F. to be be excited on the core of saturable transformer in a negative direction and the core proceeds toward saturation along line 85. The rate of change of flux is reduced at about point 86 causing a reduction in the induced voltage of winding 4. Transistor 8, commencing to lose the negative bias on its base, starts to cut off. At core saturation (in the negative direction) indicated by point 87, the decreased current in transistor 8 starts a reverse flux change toward the residual flux level at point 87. At this point a complete cycle has been completed and transistor 7 commences conduction on the next cycle.

In Fig. 2 there is shown an embodiment of the invention which provides voltage regulation of the D.-C. output. Saturable transformer 50 consists of two saturable cores 51 and 52. Saturable core 51 is controlled by windings 1 and 2 to saturate when transistor 7 is conducting and saturable core 52 is controlled by windings 3 and 4 to saturate when transistor 8 is conducting. Thus, for each half cycle of operation of the multivibrator, only one core proceeds to saturation, permitting the other core to be reset a predetermined amount in a manner similar to a push-pull magnetic amplifier. Core 51 is coupled to core 52 through secondary windings 53 and 54 so that core 52 obtains a resetting voltage from winding 54 somewhat less than that appearing on winding 53 of core 51. The square wave A.-C. output across windings 53 and 54 is taken from a point between windings 53 and 54 and the other side of winding 54 through rectifier 56 and fed through saturable reactor 57 to full wave bridge rectifier 58 and the D.-C. output is received at terminals 59 and 60. Also connected to terminals 59 and 60 to sense the output voltage is the circuit comprising filter circuit 61 which smooths the D.-C. output from rectifier 58 and feeds it into a voltage reference bridge circuit 62 consisting of diodes 63 and 64 connected back to back, and resistors 65, 66 and 67. The output from bridge circuit 62 is fed to amplifier 68 which in turn is connected through windings 69 and 70 of cores 51 and 52 respectively to ground. The amount of D.-C. flowing through windings 69 and 70 controls the frequency of oscillation of the multivibrator circuit. The frequency determining components of the multivibrator circuit are windings 1 and 4 of cores 51 and 52, respectively. The time that it takes the circuit to switch from one transistor conducting to the other transistor conducting depends upon the amount of total flux change which occurs in the saturated or gating core during its previous reset half-cycle. Thus when transistor 7 is conducting and transistor 8 blocking with core 51 saturated and core 52 desaturated, the flux of core 52 is at a level determined by the resetting voltages applied from core 51. When core 51 becomes saturated and the voltages on windings 1, 2, 3 and 4 reverse polarity, the amount of time it takes conducting transistor 8 to drive core 52 into saturation depends upon the flux change necessary in core 52 to drive the core into saturation. Therefore, the frequency may be increased or decreased depending upon the direction and magnitude of the control current through windings 69 and 70 which controls the reset level of the nonsaturated core. For example, as the current increases through windings 69 and 70, the voltage induced in windings 53 and 54 causes a current around the loop described by winding 53, winding 54, diode 56 and diode 55. The resetting action will be aided thus producing more resetting flux which lowers the frequency.

Varying the frequency of the A.-C. output across windings 53 and 54 will vary the voltage across bridge rectifier 58. During operation saturable reactor 57 will saturate in the forward direction when the voltage through the reactor is positive and will saturate in the backward or reverse direction when the voltage is negative. During the time it takes the flux in the core of saturable reactor 57 to reach the saturation level, the impedance of the reactor is comparatively high thereby reducing the A.-C. voltage to rectifier 58 a considerable amount during the saturating time.

This voltage loss at the input of rectifier 58 will occur each time reactor 57 saturates in either direction and will vary directly with the frequency of the A.-C. For example, if the frequency of the A.-C. appearing across windings 53 and 54 is increased, the number of times that reactor 57 goes through the nonsaturable to saturable action increases for a given time period thereby decreasing the average voltage appearing across rectifier 58.

The circuit in Fig. 2 operates to vary the frequency of the multivibrator circuit in proportion to the change of voltage in the output D.-C. circuit across terminals 59 and 60 in such a way as to maintain the output voltage at a predetermined voltage. For example, as the output voltage across terminals 59 and 60 starts to increase, the increased voltage is fed by filter 61 to bridge circuit 62. Diode references 63 and 64 which are adjusted to conduct at a predetermined voltage will conduct an increase in current which is fed to amplifier 68 which in turn feeds a D.-C. to control windings 69 and 70. The direction and magnitude of the current through windings 69 and 70 induces a voltage in secondary windings 53 and 54 which causes a voltage drop around the loop, winding 53, winding 54, diode 56 and diode 55. This voltage drop decreases the resetting voltage necessary to reset the flux level of the non-saturated core in saturable transformer 50, thus helping the resetting action which raises the frequency of the multivibrator circuit. This increase in frequency appears across secondary windings 53 and 54 and is fed through saturable reactor 57 which reduces the average voltage appearing across the input of rectifier 58. The D.-C. output from rectifier 58 decreases proportionately returning the voltage at terminals 59 and 60 to the predetermined regulated voltage. The voltage now presented to bridge circuit 62 is equal to that of present voltage reference 63 and no increased current is presented to amplifier 68 and windings 69 and 70. The drop in current through windings 69 and 70 returns the flux level of the nonsaturating core of saturable transformer to its former position reducing the frequency. This regulating action will occur in similar operation when the voltage across terminals 59 and 60 decreases.

Figure 3:
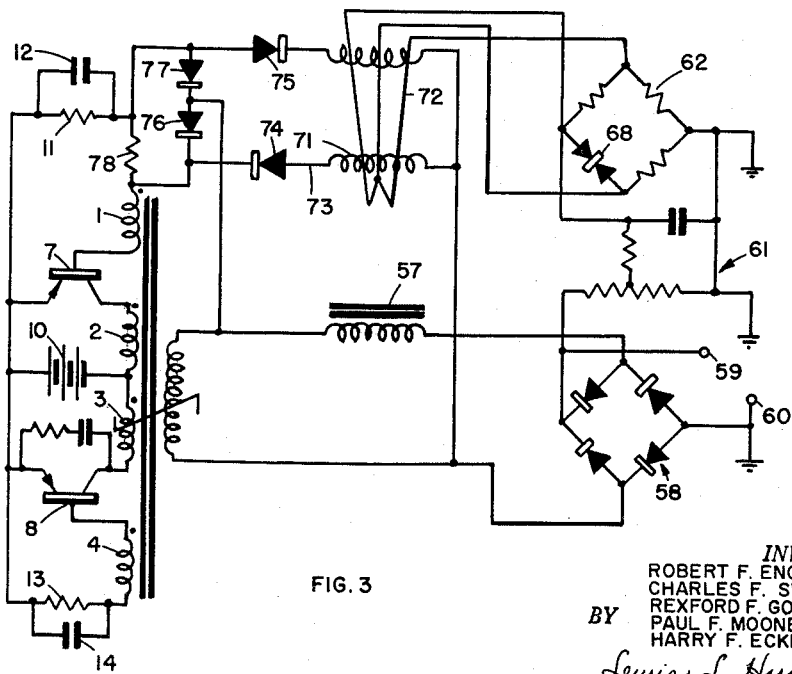
Fig. 3 is a schematic diagram showing an improvement of the voltage regulation circuit of Fig. 2.

In Fig. 3 another embodiment of the regulating portion of this invention is shown. A change in voltage across terminals 59 and 60 is fed through filter circuit 61 to bridge circuit 62. Bias winding 71 and control winding 72 of magnetic amplifier 73 are connected to receive the output from bridge circuit 62. The output from magnetic amplifier 73 is applied across resistor 78 through rectifiers 74, 75, 76 and 77. Resistor 78 is connected in series between winding 1 and resistor 11.

In operation as the voltage across terminals 59 and 60 varies from normal, for example increases, the increased voltage across bridge circuit 62 causes an increase in current through control winding 72 and increases the current output from magnetic amplifier 73. This increase in current flows through resistor 78 causing an increase in voltage drop across the resistor. Due to the position of rectifiers 74, 75, 76 and 77, current is always flowing through resistor 78 so as to make the voltage positive at the end of the resistor connected to winding 1 and negative at the end connected to resistor 11. The negative potential at the upper end of resistor 78 transferred through resistor 11 to the emitter of transistor 7 will cause the emitter of transistor 7 to go negative with respect to the base thereby cutting off transistor 7 sooner than the normal cutoff time. Since transistor 7 is now conducting for less time, the frequency of the multivibrator comprising transistors 7 and 8 is increased. This increase in frequency appearing across secondary windings 53 and 54 causes a reduction of reset voltage presented to the input of rectifier 62 through saturable reactor 57.

Turning now to Fig. 5, a better understanding of the change in frequency of the multivibrator of Fig. 2 may be had. The hysteresis curve of one of the cores of saturable transformer 5, for example core 52, under normal operation is represented by the area encompassed by the dotted lines plus the area encompassed by the solid lines. Assuming the flux of core 5' to be at point 90 wherein the multivibrator is changing states from transistor 7 conducting to transistor 8 conducting, transistor 8 will conduct until the core saturates at point 91. The amount of time that transistor 8 conducts, which determines the frequency of the multivibrator and thereby the frequency of the square wave output across windings 53 and 54, depends upon the time it takes voltage induced in the windings of the core to produce enough flux change to take the flux from point 90 to point 91. Now assume the output D.-C. voltage across terminals 59 and 60 increases beyond the predetermined regulated value. The sensing circuit through voltage reference 63 and associated circuitry will cause a D.-C. to flow through bias windings 69 and 70 of saturable transformer 50. A reset voltage is thereby induced in windings 69 and 70 which resets core 52 during the half cycle when transistor 8 is conducting and core 51 is proceeding to saturation. The reset voltage is in the direction to reset the flux of core 52 in a positive direction thereby causing core 52 to operate on the hysteresis curve represented by the area within the solid line. It is now readily apparent that when core 51 becomes saturated and transistor 8 commences conduction, the amount of flux change in core 52 necessary to produce saturation and thereby complete a half cycle of operation now is from point 92 to point 91. It can readily be seen that it will take less time to saturate core 52 going from point 92 to 91 than it was previously going from point 90 to point 91. Transistor 8 thus conducts for a shorter time thereby raising the frequency of the multivibrator. Raising the frequency of the multivibrator causes an increase of voltage loss in saturable reactor 57 lowering the voltage presented to bridge rectifier 58 thereby lowering the D.-C. voltage at terminals 59 and 60. This action continues until the voltage returns to the regulated value at which time the current sent through windings 69 and 70 is reduced lowering the reset flux level of core 52.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, a multivibrator comprising a pair of alternately conducting transistors, each said transistor having a collector, base, and emitter electrode; a saturable transformer having a first control winding connected to the base of one of said transistors, a first primary winding connected to the collector of one of said transistors, a second control winding connected to the base of the other of said transistors, and a second primary winding connected to the collector of the other of said transistors; a first R.-C. circuit connected in series with the base of one of said transistors, said first control winding, and the emitter of one of said transistors, a second R.-C. circuit connected across the collector and emitter of the other said transistor, a third R.-C. circuit connected in series with the base of the other said transistor, said second control winding, and the emitter of the other said transistor, and a D.-C. source having one end connected to the emitters of said transistors and the other end connected to the common junction of said first and second control windings.

2. The combination recited in claim 1 wherein is included a secondary winding on said saturable transformer, and rectifying means connected to said secondary winding.

3. A high voltage D.-C. power supply comprising a source of D.-C. potential, a saturable transformer having a plurality of primary windings, and a secondary winding, a pair of alternately conductive transistors connected to supply current from said source to said primary windings, one of said transistors controlled by one of said primary windings, the other of said transistors controlled by another of said primary windings whereby the voltage induced in said secondary winding by said primary windings is alternating, frequency responsive means connected to said secondary winding means, rectifying means responsive to the output of said frequency responsive means for supplying high voltage direct current to a load, and control winding means on said saturable transformer responsive to changes in voltage across said load to vary the frequency of conduction of said transistors.

4. A high voltage D.-C. power supply comprising a source of D.-C. potential, a saturable transformer having a plurality of primary windings, a plurality of control windings, and a secondary winding, a free running multivibrator comprising a pair of alternately conducting transistors connected to supply current from said source in opposite directions to said primary winding, one of said transistors controlled by one of said control windings, the other said transistor controlled by a second winding of said control windings whereby the voltage induced in said secondary winding by said primary winding is alternating, frequency responsive means connected to said secondary winding means, means responsive to the output of said frequency responsive means for supplying high voltage direct current to a load, and means including a third winding of said control windings connected to be responsive to the output of said high voltage supplying means for varying the frequency of oscillation of said free running multivibrator in response to the voltage at said voltage multiplying means, whereby the output voltage of said power supply is controlled.

5. Claim 4 as described wherein said means for varying the frequency of oscillation of said free running multivibrator includes a voltage reference circuit responsive to the output from said high voltage supply means to conduct a varying current at a constant voltage, an amplifier responsive to said voltage reference circuit, the output from said amplifier connected to said third winding of said control windings to control the reset level of said saturable transformer.

6. Claim 4 as described wherein said means for varying the frequency of oscillation of said free running multivibrator comprises a voltage reference circuit responsive to the output from said means to conduct a varying current at a constant voltage, a magnetic amplifier responsive to said voltage reference circuit, the output from said magnetic amplifier connected to control means, said control means connected in series with one of said primary windings and the emitter of one of said oppositely conductive transistors to further control the reset level of said saturable transformer.

7. Claim 4 as described wherein said means for varying the frequency of oscillation of said free running multivibrator comprises a voltage reference circuit responsive to the output from said means to conduct a varying current at a constant voltage, an amplifier responsive to said voltage reference circuit, a tertiary winding on said saturable transformer connected to receive current from said amplifier, said tertiary winding connected to control the reset level of said saturable transformer.

8. A high voltage power supply comprising a source of low D.-C. voltage, a saturable voltage step-up transformer, a plurality of transistors, at least one of said transistors connected to provide a first current path from said D.-C. source to saturate said transformer, at least another of said transistors providing a second current path from said D.-C. source to said saturable transformer, said second current path connected to saturate said transformer in the opposite direction from said first current path, feedback means including a resistor-capacitor circuit connecting said saturable transformer to said first and second current paths, rectifying means connected to receive the output of said transformer whereby a high voltage D.-C. output is provided, a resistor and capacitor connected in series between the emitter and collector of one of said transistors.

References Cited in the file of this patent

UNITED STATES PATENTS

| | | |
|---|---|---|
| 2,213,199 | Bouwers et al. | Sept. 3, 1940 |
| 2,570,014 | Schenau et al. | Oct. 2, 1951 |
| 2,693,535 | White | Nov. 2, 1954 |
| 2,748,274 | Pearlman | May 29, 1956 |
| 2,774,878 | Jensen | Dec. 18, 1956 |
| 2,783,380 | Bonn | Feb. 26, 1957 |
| 2,783,384 | Bright et al. | Feb. 26, 1957 |
| 2,798,160 | Bruck et al. | July 2, 1957 |
| 2,809,239 | Nielsen | Oct. 8, 1957 |
| 2,811,643 | Eberhard | Oct. 29, 1957 |
| 2,813,976 | Uchrin et al. | Nov. 19, 1957 |
| 2,817,761 | Hollmann | Dec. 24, 1957 |
| 2,846,581 | Volkers | Aug. 5, 1958 |
| 2,854,614 | Light | Sept. 30, 1958 |
| 2,883,539 | Bruck et al. | Apr. 21, 1959 |